Inventor
P. J. Aldridge
By Holcomb, Wetherill & Brisebois
Attorneys

SOUND RECORDING AND REPRODUCING APPARATUS

Filed Dec. 3, 1962 2 Sheets-Sheet 2

Inventor
P. J. Aldridge
By Holcomb, Wetherill & Brisebois
Attorneys 3,137,430
Patented June 16, 1964

3,137,430

SOUND RECORDING AND REPRODUCING APPARATUS

Peter John Aldridge, Upminster, Essex, England, assignor to The Magnavox Electronics Company Limited, Barking, England, a British company Filed Dec. 3, 1962, Ser. No. 241,874
Claims priority, application Great Britain Dec. 5, 1961
2 Claims. (Cl. 226—180)

This invention relates to tape decks, tape recorders and other sound reproducing or recording apparatus in which a magnetic tape on which a recording is made is moved through the apparatus at a constant speed by a driving pulley, which is usually known as a capstan. The tape is driven frictionally by the capstan, and for this purpose it must be held firmly in contact with it. One way of doing this is by pressing the tape directly into contact with the capstan by means of a spring-loaded pressure roller. The tape passes through the nip between the surface of the capstan and that of the pressure roller. It is important that the pressure roller should bear against the capstan with an even pressure along the whole of its line of contact, so that there is an even pressure across the full width of the tape. If this does not happen the tape will be unevenly worn and its life will be considerably reduced. Uneven pressure may also cause the tape to travel out of a straight line and it may ride up or down on the capstan above or below the pressure roller.

According to the present invention, the pressure roller in such apparatus is mounted on an arm which is hinged to allow the roller to move towards and away from the capstan, the hinge being formed by a thin strip of flexible material which allows the arm to swing in the plane of the roller and also allows the arm to twist slightly so that the roller can rock to a limited extent about an axis at right angles to its axis of rotation to align its surface with that of the capstan and exert an even pressure across the width of the tape.

The flexible material of which the hinge is made may be thin spring steel, but it has been found that this material tends to become fatigued, and may crack. Tests have shown that a plastic material is very much more satisfactory. Thin sheet nylon is preferred, because this maintains its flexibility and resilience over very long periods without becoming fatigued or cracked in any way.

The pressure roller is preferably pressed against the capstan by a spring which acts on the free end of the arm along a line of action which passes through the centre line of the path of the tape. This spring may be U-shaped and it then has one end attached to a fixed mounting and the other end attached to the arm. The spring may be arranged to operate in an over-centre manner so that when the arm is swung about its hinge away from the capstan, the roller is held by the spring away from the capstan and, when the arm is swung in an opposite direction, the spring moves past a dead centre position and holds the roller in contact with the capstan.

Figure 1:
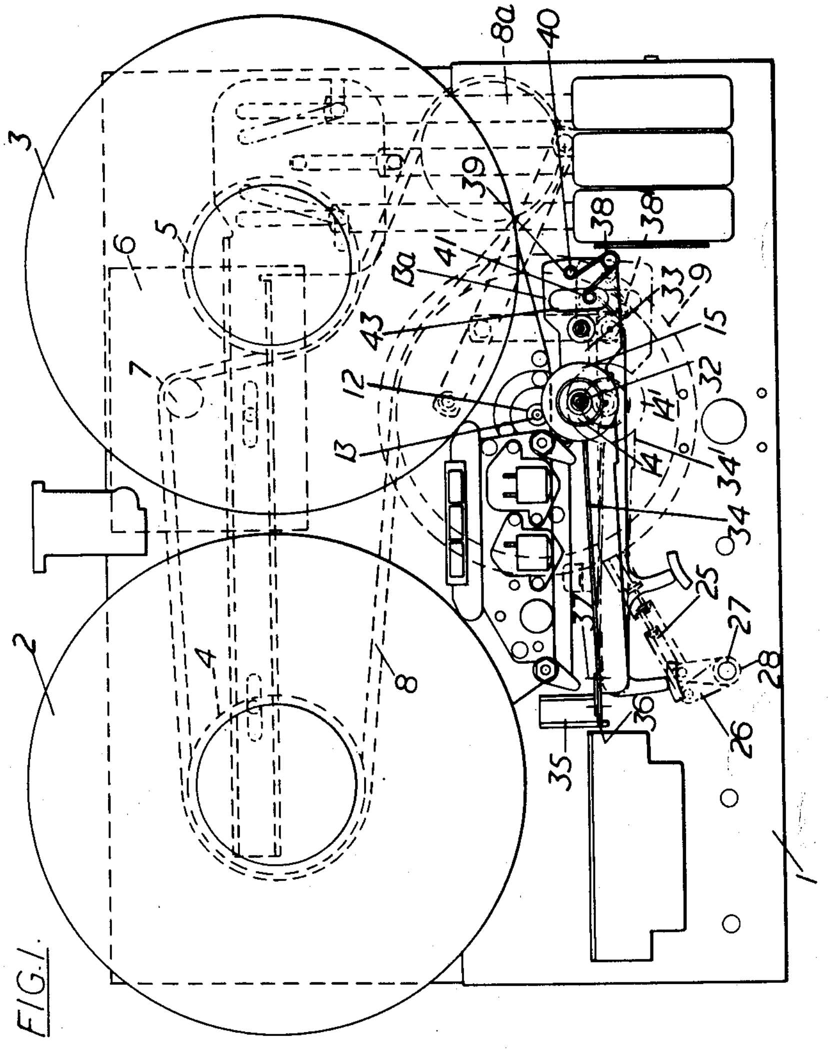
Figure 2:
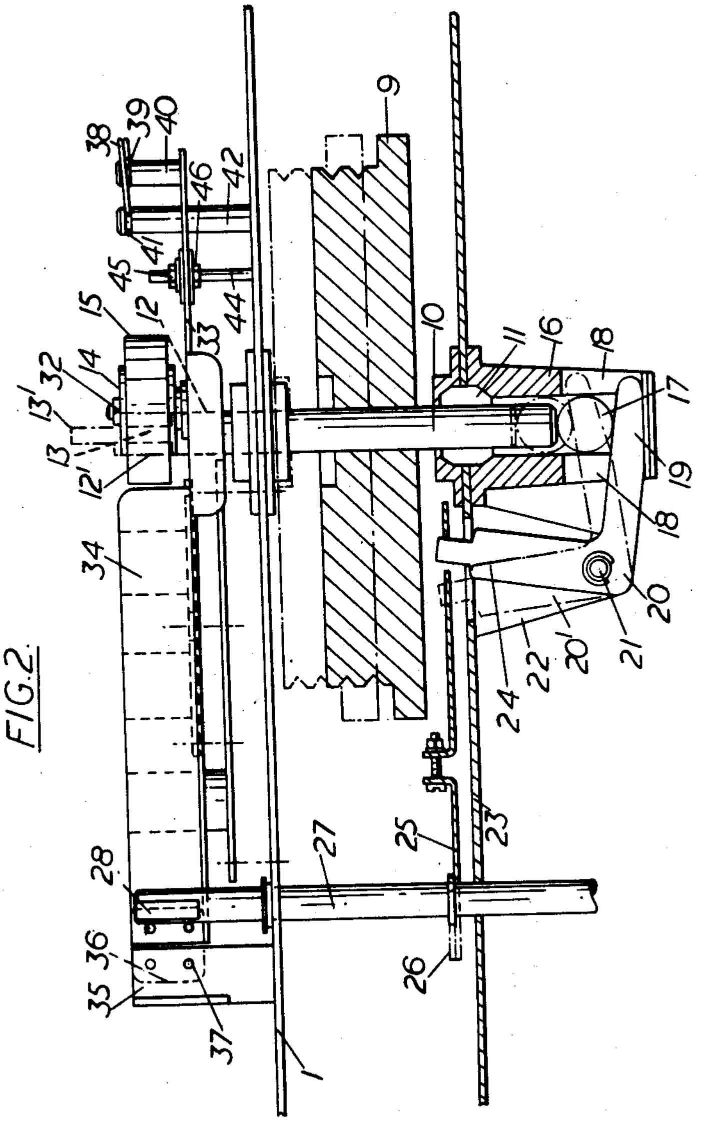

An example of a tape recorder constructed in accordance with the invention is illustrated in the accompanying drawings, in which:

FIGURE 1 is a somewhat diagrammatic plan view of the tape recorder showing the capstan and the other parts of the recorder which are relevant to the present invention; and FIGURE 2 is a view of a part of the tape recorder as seen in the direction of the arrows on the line 2—2 in FIGURE 1 with some parts shown in section.

The tape recorder has a base plate 1, which forms a chassis carrying the various parts of the mechanism. Two tape reels 2 and 3 are rotatably mounted on the base plate 1 and have pulleys 4 and 5 respectively attached to them. The main rotating parts of the apparatus are driven by an electric motor 6 which drives a belt pulley 7. The belt pulley 7 drives a belt 8 which passes round the tape reel pulleys 4 and 5, around a guide wheel 8a and also around a fly wheel 9. The fly wheel 9 is fixed to a spindle 10 which is carried in a bearing 11. The upper end of the spindle 10 has two portions 12 and 13 of different diameters. These portions form the capstan against which the tape 13a is pressed by a pressure roller 14 having a rubber tyre 15 mounted on it.

The bearing 11 is fixed in a housing 16 in the bottom of which is a ball bearing 17 on which the spindle 10 rests. The housing 16 has two vertical slots 18 in its wall, and through these slots, one arm 19 of a bell crank lever 20 projects. The bell crank lever 20 is pivoted on a pin 21 fixed to a bracket 22 extending downwards from a plate 23 which is fixed by brackets (not shown) to the underside of the base plate 1. The bell crank lever 20 has a second arm 24 to which an operating rod 25 is attached. The operating rod 25 connects the arm 24 to a lever 26 fixed to a vertical shaft 27 having a manual control knob 28 at its top end. The knob 28 can be turned clockwise or counter-clockwise and moves the lever 26 with it.

With the bell crank lever 20 in the position shown in full lines in FIGURE 2 of the drawings, the ball bearing 17 is in the lowest position it can reach in the housing 16 and also the spindle 10 is in its lowest position in which the portion 13 at its upper end is in alignment with the edge of the roller 14. On rotating the knob 28 in a counter-clockwise direction as shown in FIGURE 1 of the drawings, the bell crank lever 20 is moved into the position shown in dotted lines at 20' in FIGURE 2 of the drawings and the spindle 10 is raised so that the portion 13 reaches the position 13' and the portion 12 reaches the position 12' in which it is aligned with the roller 14. The spindle 10 is rotated at constant speed by the motor 6 and thus the tape can be driven through the machine at either one of two speeds according to whether it is pressed by the roller 13 into contact with the portion 12 or the portion 13 forming the capstan. This arrangement for altering the speed at which the tape is driven through the tape recorder is described and claimed in my co-pending application Serial No. 241,873.

The pressure roller 14 is freely rotatably mounted on a pin 32 which is fixed to the bottom portion 33 of an arm 34 which is L-shaped over the greater part of its length. The left hand end of the upright portion of the arm 34 is hinged to a bracket 35 projecting upwards from the base plate 1 by a thin nylon strip 36 which is fixed to the arm 34 and the bracket 35 by rivets 37. The strip 36 is able to bend and in so doing allows the arm 34 to rock to and fro in a horizontal plane. The right hand end of the arm 34 is acted upon by a U-shaped spring 38, one end 39 of which is attached to a pin 40 projecting upwards from the right hand end of the arm 34. The other end 41 of the spring 38 is attached to a pin 42 which is fixed to the base plate 1 and projects upwards through a slot 43 in the bottom part 33 of the arm 34.

When the arm 34 is in the position shown in full lines in FIGURE 1 of the drawings, the spring 38 the arms of which tend to spring apart from each other urges the pin 40 upwards as seen in FIGURE 1 and thus urges the tyre 15 on the roller 14 against the capstan formed by the top of the spindle 10. If, however, the arm 34 is pulled manually downwards, the spring 38 passes through a dead centre position between the pins 40 and 42 and rotates into the position shown at 38' in dotted lines in FIGURE 1. With the spring 38 in the position 38', it tends to urge the arm 34 in a clockwise direction into the position shown in dotted lines in FIGURE 1 at 34' and thus holds the roller 14 in the position shown at 14' in dotted lines away from the capstan. When the roller 14 is held away from the capstan in this manner, the tape 13*a* can be threaded through the space between the roller and the capstan and also the knob 28 can be operated to bring either the portion 12 or the portion 13 into alignment with the edge of the roller 14.

Owing to the flexibility of the strip 36, the arm 34 is free not only to rock in a horizontal plane but also to twist to a very limited extent about a horizontal axis passing through the plane of the strip 36. This allows the edge of the roller 14 to rock slightly so that it is aligned with the surface of the portion 12 or the portion 13 to ensure that the roller exerts an even pressure on the tape over its full width.

A screw threaded pin 44 passes through a hole in the part 33 of the arm 34 and is fixed to the part 33 by lock nuts 45 and 46. The lower end of the pin 44 bears on the upper surface of the base plate 1 and so supports the right hand end of the arm 34. By loosening the nut 46 and tightening the nut 45 the arm 34 can be raised slightly and, conversely, by loosening the nut 45 and tightening the nut 46 the arm 34 can be lowered slightly. This adjustment of the arm 34 allows the edge of the tyre 15 to be accurately aligned with the portion 13 or 12 of the capstan. The freedom of movement of the arm 34 upwards and downwards, which is allowed by a slight distortion of the strip 36, is only very slight but this is all that is necessary.

I claim:

1. In sound reproducing and recording apparatus comprising a capstan for moving a tape through said apparatus, means driving said capstan, and a pressure roller for pressing said tape against said capstan, the improved means for mounting said pressure roller which comprises a support, a thin strip of flexible material forming a hinge fixed to said support, an arm having one end fixed to said thin strip of flexible material, means mounting said pressure roller on said arm, U-shaped spring means, a fixed mounting, means attaching one end of said spring means to said fixed mounting and means attaching the other end of said spring means to the other end of said arm, said spring operating in an over-center manner so that when said arm is swung about said flexible strip away from said capstan, said roller is held by said spring away from said capstan and when said arm is swung in an opposite direction, said spring moves past a dead-center position and holds said roller in contact with said capstan, said hinge formed by said thin strip of flexible material allowing said arm, in addition to swinging in the plane of said roller, to twist slightly so that said roller can rock to a limited extent about an axis at right angles to its axis of rotation to align said surface of said roller with that of said capstan and allow said spring to cause said roller to exert an even pressure across the whole width of said tape.

2. Apparatus as claimed in claim 1, further including means for raising and lowering said arm in a plane parallel to the axis of said roller, said adjusting means causing distortion of said flexible strip to align said roller with said capstan in a direction along the axis of said capstan.

References Cited in the file of this patent

UNITED STATES PATENTS

| | | |
|---|---|---|
| 3,021,989 | Sellers | Feb. 20, 1962 |
| 3,093,335 | Lane | June 11 1963 |

FOREIGN PATENTS

| | | |
|---|---|---|
| 759,394 | Great Britain | Oct. 17, 1956 |